United States Patent [19]
Kesler et al.

[11] Patent Number: 5,981,875
[45] Date of Patent: Nov. 9, 1999

[54] ELECTRICAL DEVICE WATERPROOF COVER WITH SNAP-IN MODULAR PLATES

[75] Inventors: Gregory J. Kesler; Kenneth R. Schnell, both of South Bend, Ind.

[73] Assignee: Hubbell Incorporated, Orange, Conn.

[21] Appl. No.: 08/810,163

[22] Filed: Feb. 28, 1997

[51] Int. Cl.⁶ .................................................. H05K 5/03
[52] U.S. Cl. ..................... 174/66; 220/3.94; 220/241; 220/3.8
[58] Field of Search .................. 174/66; 220/3.8, 220/241, 3.92, 3.94, 4.02

[56] References Cited

U.S. PATENT DOCUMENTS

| | | | |
|---|---|---|---|
| 801,536 | 10/1905 | Marshall | 220/241 |
| 1,717,871 | 6/1929 | Both | 220/241 |
| 3,168,613 | 2/1965 | Palmer | 220/3.94 X |
| 3,200,989 | 8/1965 | Hubbell | 220/242 |
| 3,278,066 | 10/1966 | George et al. | 220/241 |
| 3,953,933 | 5/1976 | Goldstein | 220/241 X |
| 4,102,466 | 7/1978 | Jadatz | 220/3.8 |
| 4,134,516 | 1/1979 | Sullo | 220/242 |
| 4,265,365 | 5/1981 | Boteler | 220/3.8 X |
| 4,381,063 | 4/1983 | Leong | 220/3.8 X |
| 4,780,573 | 10/1988 | Own | 174/66 |
| 4,967,924 | 11/1990 | Murofushi et al. | 220/3.8 |
| 5,178,350 | 1/1993 | Vink et al. | 220/3.8 X |
| 5,228,584 | 7/1993 | Williams, Jr. | 220/3.8 |
| 5,251,771 | 10/1993 | Hotsumi et al. | 220/241 X |
| 5,696,350 | 12/1997 | Anker | 174/66 |
| 5,700,978 | 12/1997 | Huff | 220/3.94 X |

*Primary Examiner*—Dean A. Reichard
*Attorney, Agent, or Firm*—Jerry M. Presson; William C. Roch

[57] ABSTRACT

A waterproof cover for electrical devices such as electrical outlets, receptacles, switches, ground fault circuit interrupters, dimmers, etc. The waterproof cover has snap-in modular cover plates which can be used either alone with one gang covers or outlet boxes, or ganged together in combination for use with two gang electrical covers or outlet boxes. The cover plate has a side edge which defines an overhanging interlock extending along a first length of the side edge and an underhanging interlock extending along a second length of the side edge. The arrangement is such that the overhanging interlock can interlock with an underhanging interlock and the underhanging interlock can interlock with an overhanging interlock of a second similar cover plate to form a two gang cover plate for a two gang weatherproof cover. Alternatively, the overhanging interlock can interlock with an underhanging interlock and the underhanging interlock can interlock with an overhanging interlock of a one gang waterproof cover. At least one other side edge of the cover plate snap fits under at least one retention boss in the cover, and in a disclosed embodiment three other side edges of the cover plate snap fit under retention bosses in the cover and are secured between the retention bosses and a seating flange.

14 Claims, 6 Drawing Sheets

ELECTRICAL DEVICE WATERPROOF COVER WITH SNAP-IN MODULAR PLATES

BACKGROUND OF THE INVENTION

1. Field of the Invention

The present invention relates generally to a waterproof cover for electrical devices such as electrical outlets, receptacles, switches, ground fault circuit interruptors, dimmers, etc., and more particularly pertains to an electrical device waterproof cover with snap-in modular cover plates which can be used either alone with one gang covers or outlet boxes, or ganged together in combination for use with two gang electrical covers or outlet boxes.

2. Discussion of the Prior Art

The present invention relates generally to waterproof covers and enclosures for electrical devices such as electrical outlets, receptacles, switches, ground fault circuit interrupters, dimmers, etc. Weatherproof electrical covers or outlet boxes are well known in the industry to provide a cover for an electrical device mounted within the cover so that the cover and electrical device can be mounted outdoors. The purpose of the cover is primarily to prevent water, dust and other foreign materials from entering the device. It is of particular importance to prevent rain water and moisture from entering the electrical device to reduce the risk of short circuits, fire and damage to the device and the electrical systems connected thereto.

A typical electrical device waterproof cover is generally rectangular and closed on five sides. The waterproof cover can be recessed into or mounted exteriorly of a structure so that its open side is accessible. The cover is typically sized to receive standard electrical devices such as a duplex receptacle which is secured to the cover with its front face substantially flush with or projecting slightly through a front cover plate of the cover or outlet box. Suitable openings in a wall of the box permits the passage of electrical leads for connecting the device to a suitable source of electric power.

A cover of the general type described herein includes a cover plate which is generally coextensive with the open front side of the cover. The cover plate is provided with one or more apertures which are shaped and located so as to expose one or more electrical devices such as outlets or switches which typically project into and through the apertures in the cover plate. The cover plate is normally secured in place either by a screw or other fastener extending through an opening in the cover plate and extending into a threaded hole in the cover or outlet. The usual weatherproof outlet box or cover also includes one or more hinged waterproof lids or exterior covers overlying the cover plate to protect the electrical device mounted in the box from the weather when the device is not in usage.

Existing prior art waterproof cover designs are generally of two basic designs; an integral cover/plate construction and a cover/modular (separate) plate. A summation of the differences and advantages between the modular cover and cover plate design of the present invention and those manufactured by Carlon and are as follows:

| FEATURE | CARLON | INVENTION | ADVANTAGE |
| --- | --- | --- | --- |
| Single gang plate can be used in two gang cover | No | Yes | Diversification, fewer parts |
| Plates snap into cover | No | Yes | Faster assembly |
| Plates interlock | No | Yes | Better plate retention |
| Plates have foolproof locators | No | Yes | Insures proper installation |

SUMMARY OF THE INVENTION

Accordingly, it is a primary object of the present invention to provide a waterproof cover for electrical devices.

A further object of the subject invention is the provision of an electrical device waterproof cover with snap-in modular cover plates which can be used either alone with one gang covers or outlet boxes, or ganged together in combination for use with two gang electrical covers or outlet boxes.

In accordance with the teachings herein, the present invention provides a cover plate for a one gang or two gang weatherproof cover for an electrical device wherein the cover plate defines at least one aperture therein to receive at least one electrical device. The cover plate has a side edge which defines an overhanging interlock extending along a first length of the side edge and an underhanging interlock extending along a second length of the side edge. The arrangement is such that the overhanging interlock can interlock with an underhanging interlock and the underhanging interlock can interlock with an overhanging interlock of a second similar cover plate to form a two gang cover plate for a two gang weatherproof cover. Alternatively, the overhanging interlock can interlock with an underhanging interlock and the underhanging interlock can interlock with an overhanging interlock of a one gang waterproof cover.

In greater detail, one inside edge of the cover defines an overhanging interlock extending along a first length of the inside edge and an underhanging interlock extending along a second length of the inside edge. Moreover, at least one other side edge of the cover plate snap fits under at least one retention boss in the cover, and in a disclosed embodiment three other side edges of the cover plate snap fit under retention bosses in the cover and are secured between the retention bosses and a seating flange. The cover plate includes an angled chamfer at one corner, and the cover also includes an angled chamfer at one corner, to ensure a proper positioning of the cover plate with respect to the cover. The cover is preferably constructed of a nonmetallic, nonconductive, resilient material which is sufficiently resilient to allow the cover and retention bosses to deform resiliently outwardly during the snap-fit installation of a cover plate therein.

In one disclosed embodiment, the first length of overhanging interlock and the second length of underhanging interlock are of unequal lengths to assure proper assembly with either a second similar cover plate to form a two gang cover plate, or with a single gang cover. In a prederred embodiment, the first length of overhanging interlock and the second length of underhanging interlock meet at a first common end located near the center of the length of the cover plate, and a second end of the first length of overhanging interlock defines a small length of underhanging interlock, and a second end of the second length of underhanging interlock also defines a small length of overhanging interlock, wherein the small lengths are provided to prevent rotation of assembled interlocked cover plates.

The cover plates are designed such that they can be assembled with each other or with a cover only in a correct position, such that labels such as an Underwriters Laboratory (UL) label and countersunk drill holes are properly positioned on the outside of the cover plate. The cover plates are universal ambidextrous designs such that there are no left or right cover plates and the universal cover plates can only be assembled in correct positions.

BRIEF DESCRIPTION OF THE DRAWINGS

The foregoing objects and advantages of the present invention for an electrical device waterproof cover with snap-in modular plates may be more readily understood by one skilled in the art with reference being had to the following detailed description of several preferred embodiments thereof, taken in conjunction with the accompanying drawings wherein like elements are designated by identical reference numerals throughout he several views, and in which.

DETAILED DESCRIPTION OF THE DRAWINGS

Figure 1:
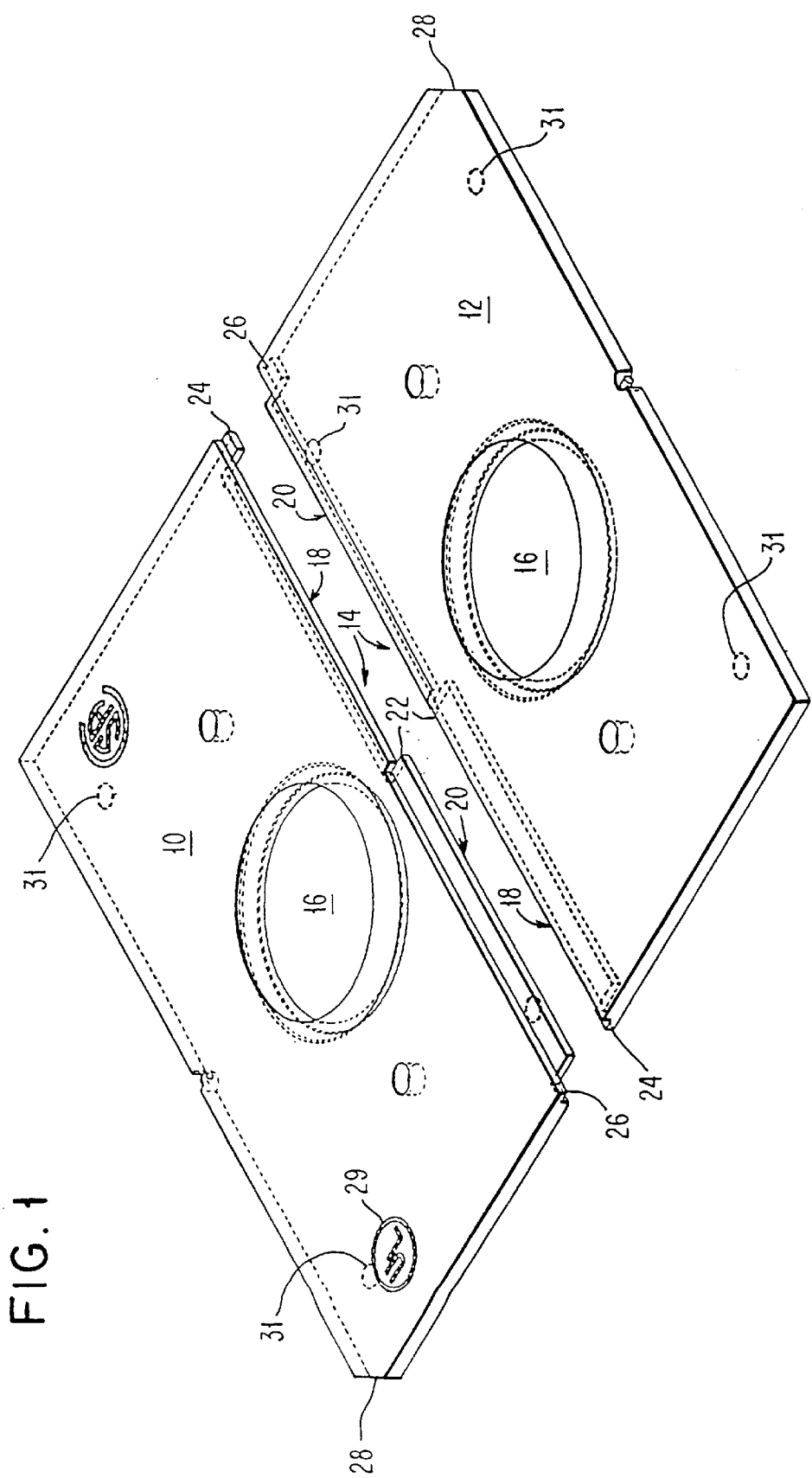
FIG. 1 illustrates first and second nonmetallic snap-in modular cover plates, which can be used either alone with one gang covers or outlet boxes, or ganged together in combination for use with two gang electrical covers or outlet boxes.

Referring to the drawings in detail, FIG. 1 illustrates a first embodiment of the present invention, and shows first and second nonmetallic snap-in modular cover plates 10,12, each of which can be used either alone with a one gang cover or outlet box or can be ganged together in combination for use with a two gang electrical cover or outlet box.

Figure 7:
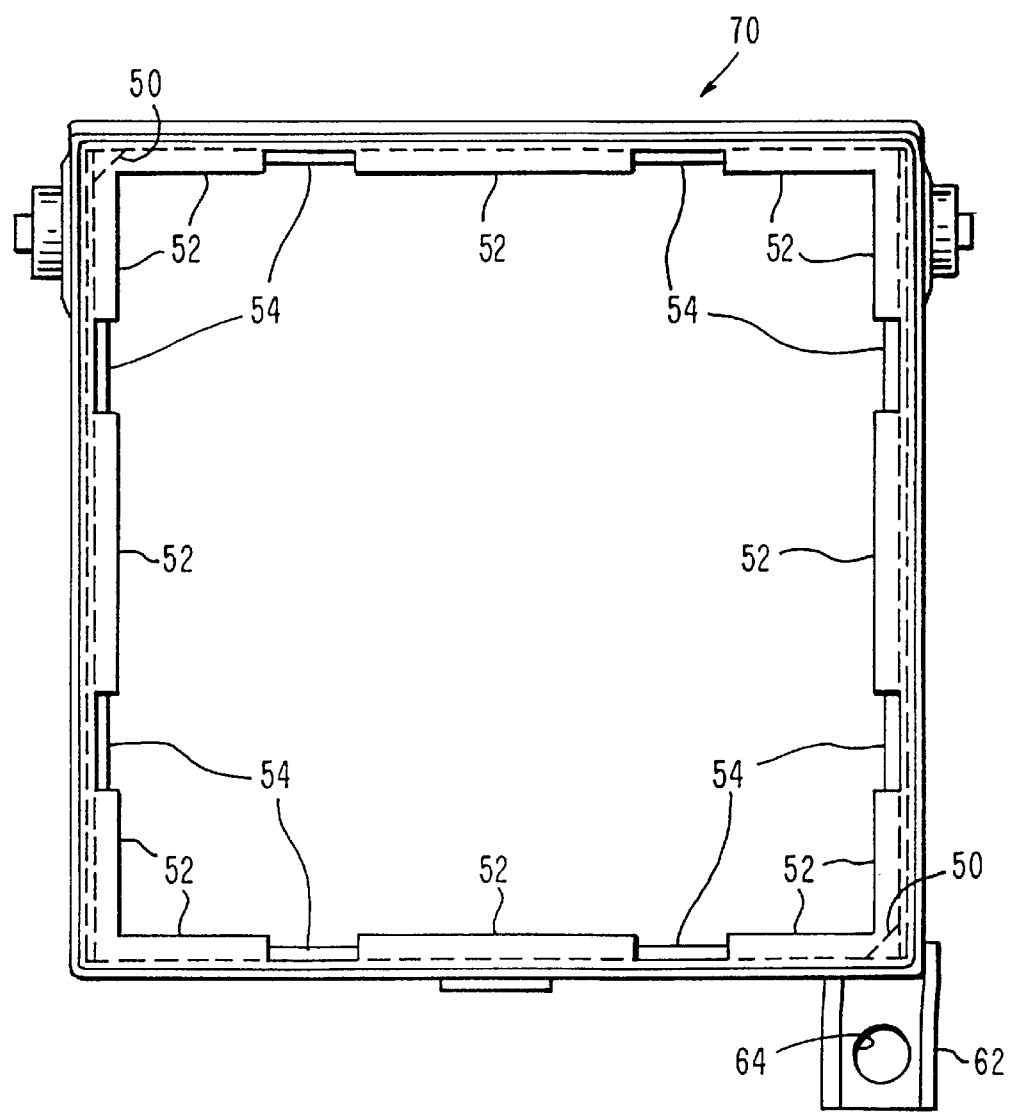
FIG. 7 illustrates a rear elevational view of a two gang cover for use with two modular cover plates which are ganged together to form a two gang cover plate as shown schematically in FIG. 1, or a two gang cover plate as shown in FIG. 10.

The improved design for the snap-in modular cover plate features a unique interlock to ensure proper positioning during assembly by an end user. The first and second cover plates are substantially identical in construction, and each cover plate can be used separately as a single cover plate for a one gang cover or outlet box as illustrated in FIGS. 2 through 5. Alternatively, the first and second cover plates can be interlocked together along their common facing side edges 14 (as illustrated schematically in FIG. 1), and the ganged together cover plates now form a single cover plate for use with a two gang cover as shown in FIG. 7.

Referring to FIG. 1, each cover plate 10,12 defines at least one aperture 16 therein to receive at least one electrical fixture extending therethrough. Each cover plate is preferably constructed of a nonmetallic nonconductive material such as polycarbonate or PVC. Each cover plate has a side edge 14 which defines an overhanging interlock 18 extending along a first length of the side edge 14 and an underhanging interlock 20 extending along a second length of the side edge 14. During assembly of the first cover plate 10 with the second similar cover plate 12, the overhanging interlock 18 of the first cover plate 10 interlocks with the underhanging interlock 20 of the second similar cover plate 12. Similarly, the underhanging interlock 20 of the first cover plate 10 interlocks with the overhanging interlock 18 of the second similar cover plate to form a two gang cover plate for a two gang weatherproof cover. The reverse interlock or flange orientation provides additional strength to the assembled and interlocked cover plates.

Alternatively, during assembly of a single one gang cover plate 10 or 12 with a one gang cover, as illustrated in FIGS. 2 through 5, the overhanging interlock 18 interlocks with an underhanging interlock of the one gang waterproof cover, and the underhanging interlock 20 interlocks with an overhanging interlock of the one gang waterproof cover. The other three side edges of the cover plate snap fit into undercuts in the one gang cover.

Each cover plate 10,12 also includes a 45° chamfer 28 at one corner to ensure proper positioning of the cover plate with respect to a cover which also includes a 45° chamfer at one corner as described in greater detail hereinbelow. The first length of overhanging interlock 18 and the second length of underhanging interlock 20 are preferably of slightly different or unequal lengths to assure proper assembly, with either a second similar cover plate to form a two gang cover plate, or with a single gang cover.

The cover plate 10,12 as described hereinabove can be one embodiment of the present invention. However, a second embodiment of the present invention can include additional interlocks as described hereinbelow to prevent any rotation of the assembled interlocked cover plates. The first length of overhanging interlock 18 and the second length of underhanging interlock 20 meet at a first common junction end 22 located near the center of the length of the cover plate. The other or second end of the first length of overhanging interlock 18 defines a small length of underhanging interlock 24, and the other or second end of the second length of underhanging interlock defines a small length of overhanging interlock 26. During assembly, the small lengths 24,26 also interlock, and are provided to prevent any rotation of the assembled interlocked cover plates. In different embodiments, the relative lengths of the interlocks 18, 20, 24 and 26 can vary. For instance, in some embodiments the lengths of the interlocks 18, 20, 24 and 26 can all be substantially the same length. Moreover, different numbers of interlocks other than two or four might be utilized in different embodiments including odd numbers of interlocks.

Figure 3:
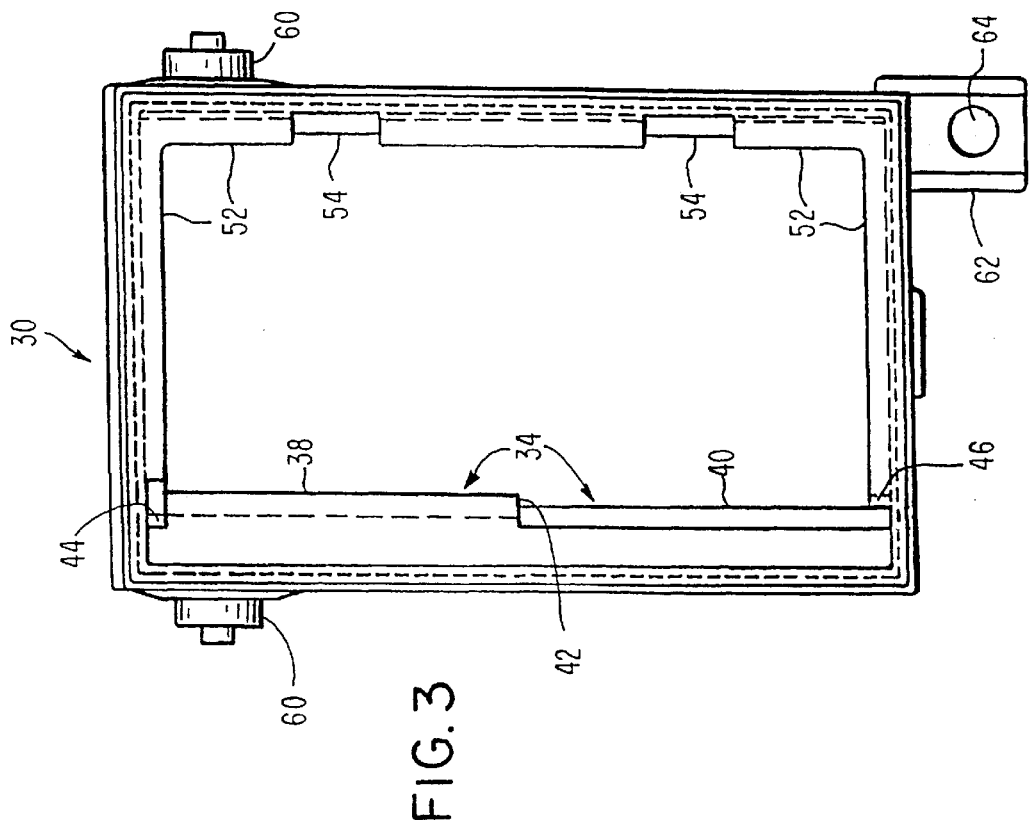
FIGS. 2 and 3 are respectively side and rear elevational views of one embodiment of a vertical one gang cover for use with one of the snap-in modular cover plates of FIG. 1.
Figure 2:
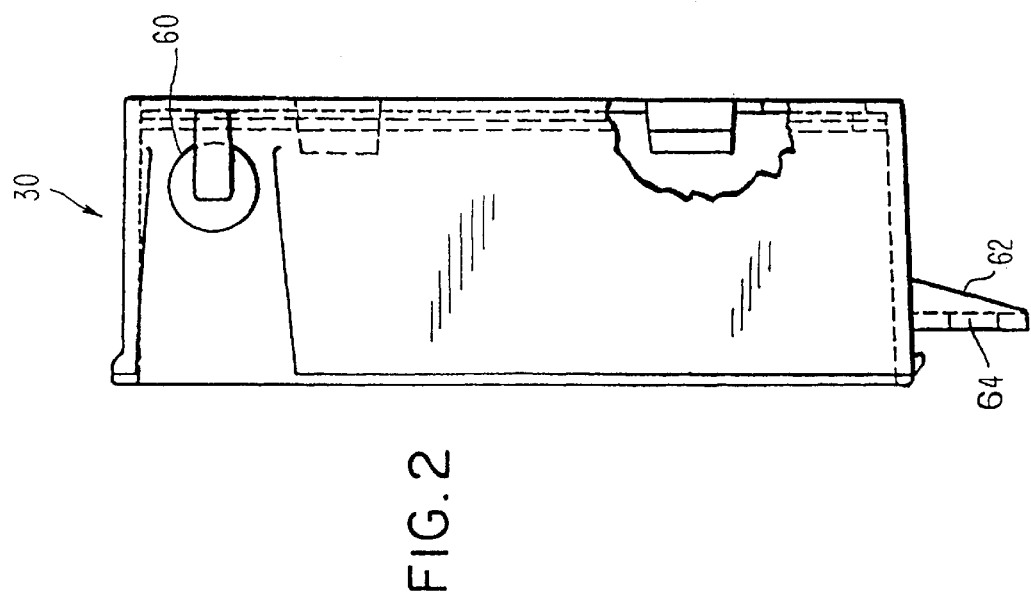
Figure 5:
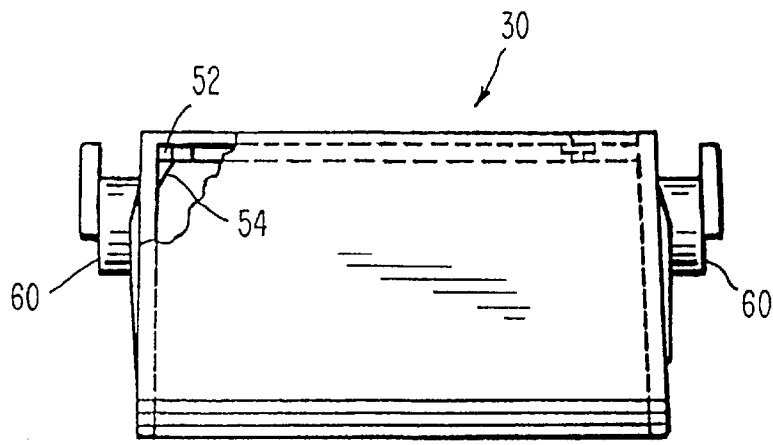
FIGS. 4 and 5 are respectively a front elevational view and a top plan view of the vertical one gang cover shown in FIGS. 2 and 3.
Figure 4:
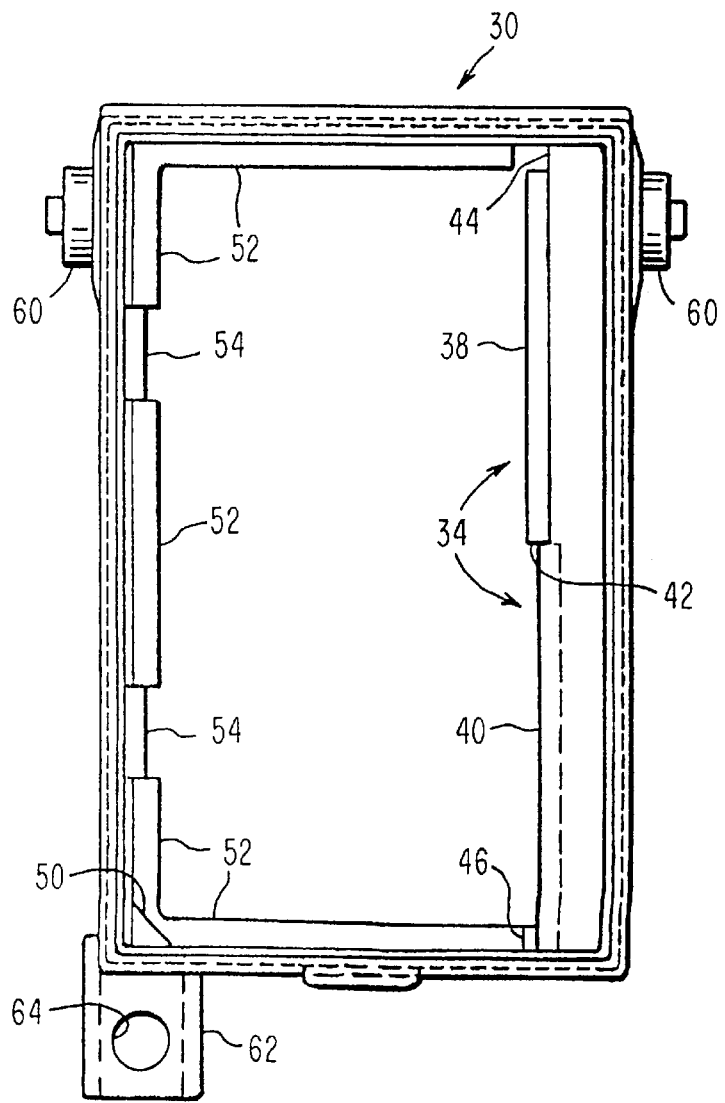

FIGS. 2 and 3 are respectively side and rear elevational views of one embodiment of a vertical cover 30 for use with one of the snap-in modular cover plates 10 or 12 of FIG. 1. FIGS. 4 and 5 are respectively a front elevational view and a top plan view of the same vertical one gang cover 30 shown in FIGS. 2 and 3. As illustrated in FIGS. 3 and 4, one inside edge 34 of the cover 30 defines an overhanging interlock 38 extending along a first length of the side edge 34 and an underhanging interlock 40 extending along a second length of the side edge 34. Similar to the construction of the cover plates 10,12, the first length of overhanging interlock 38 and the second length of underhanging interlock 40 meet at a first common junction end 42 located near the center of the length of the cover. The other or second end of the first length of overhanging interlock 38 defines a small length of underhanging interlock 44, and the other or second end of the second length of underhanging interlock defines a small length of overhanging interlock 46.

The cover 30 also includes a 45° chamfer 50 at one corner to ensure proper positioning of a cover plate 10 or 12 with respect to the cover 30. The cover 30 also includes a seating flange 52 upon which a cover plate 10 or 12 is seated when snap-fitted into place in the cover 30, and barbed retention bosses 54 which secure the cover plate in position once it is snap-fitted into place in the cover 30. The cover 30 is constructed of a nonmetallic nonconductive material such as polycarbonate or PVC which is also sufficiently resilient to allow the sides thereof with the barbed retention bosses to deform resiliently outwardly during the snap-fit installation of a cover plate therein.

Figure 6:
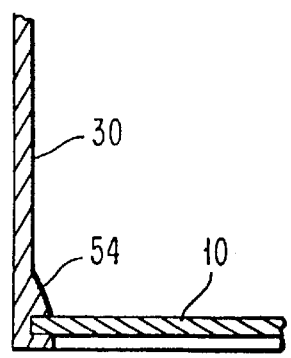
FIG. 6 is a schematic illustration of a cover plate snap fitted into place in a cover wherein the cover plate is secured in place therein by barbed retention bosses in the cover.

During assembly, the interlocks of the cover plate 10 or 12 of FIG. 1 are first interlocked with the corresponding interlocks of the cover 30, and the cover plate is then pressed into position, pushing the resiliently mounted retention bosses 54 out of the way until the cover plate is seated on the seating flanges 52, and the resiliently mounted retention bosses 54 then return to their normal positions to securely retain the cover plate under the barbed retention bosses 54, as illustrated schematically in FIG. 6.

The cover plates 10,12 are designed such that they can be assembled with each other or with a cover only in a correct position, such that labels such as a UL label 29 and countersunk drill holes 31 are properly positioned on the outside of the cover plate. The design features ensuring such correct positioning include the design of the interlocks and the 45° chamfers 28. The cover plates are universal ambidextrous designs such that there are no left or right cover plates and the universal cover plates can only be assembled in correct positions.

The cover illustrated in FIGS. 2–5 is generally of a type as disclosed in U.S. Pat. No. 5,228,584, commonly assigned herewith to Hubbell, Inc. As such, the cover includes structure to provide a hinge to an overlying exterior cover (not shown), including two hinge pins 60 extending outwardly from each of the side walls thereof. The hinge pins 60 are coaxially positioned on the side walls to define a pivot axis for the exterior cover. The hinge pins 60 are positioned proximate to the upper side wall of the base and proximate to the rear wall. The hinge pins are preferably integrally formed with the base as cylindrical projections. The cover also includes a flange 62 extending outwardly from the bottom end wall. The flange 62 includes an aperture 64 and is positioned to overlie a similar flange, also having an aperture, in the exterior cover (not shown) when the exterior cover is in the closed position such that the flanges and apertures are aligned, and a suitable lock may be placed through the apertures to lock the exterior cover in the closed position.

FIGS. 2–5 illustrate a vertical one gang cover. However, the structure illustrated therein is also applicable to other one gang covers, such as a horizontal one gang cover or other constructions.

FIG. 7 illustrates a rear elevational view of a two gang cover 70. The two gang cover of FIG. 7 includes structural elements 50, 52 and 54 similar to those of the embodiment of FIGS. 2–5 which operate in a similar manner. The two gang cover 70 can be assembled for use with two modular cover plates which are ganged together to form a two gang cover plate as shown schematically in FIG. 1, or a two gang cover plate as shown in FIG. 10.

Figure 8:
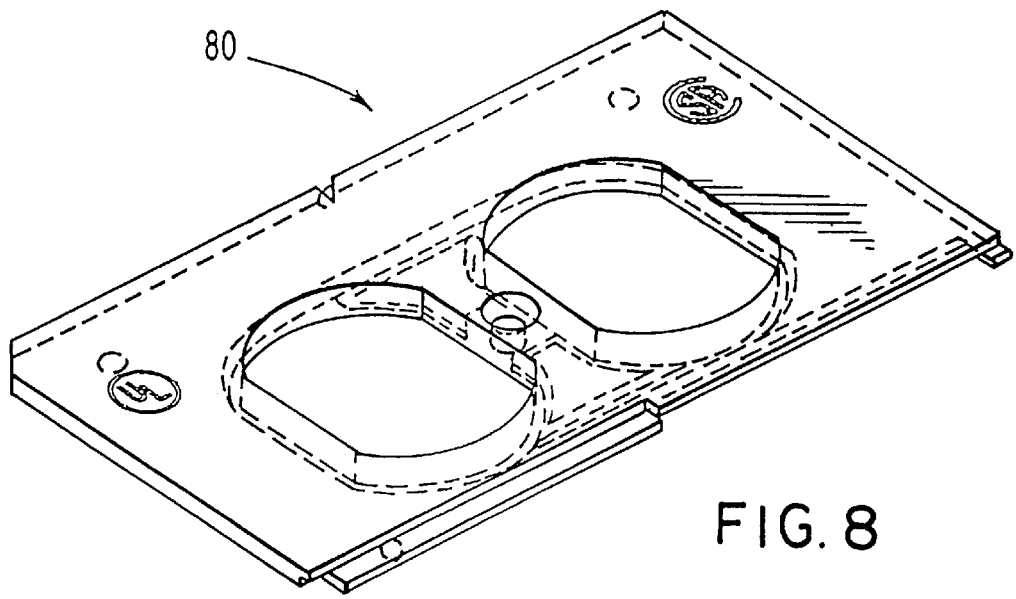
FIGS. 8, 9 and 10 illustrate typical alternative configurations for a cover plate, showing respectively a typical duplex cover plate, a GFCI cover plate, and a 2.15 inch diameter cover plate for a two gang cover as illustrated in FIG. 6.
Figure 9:
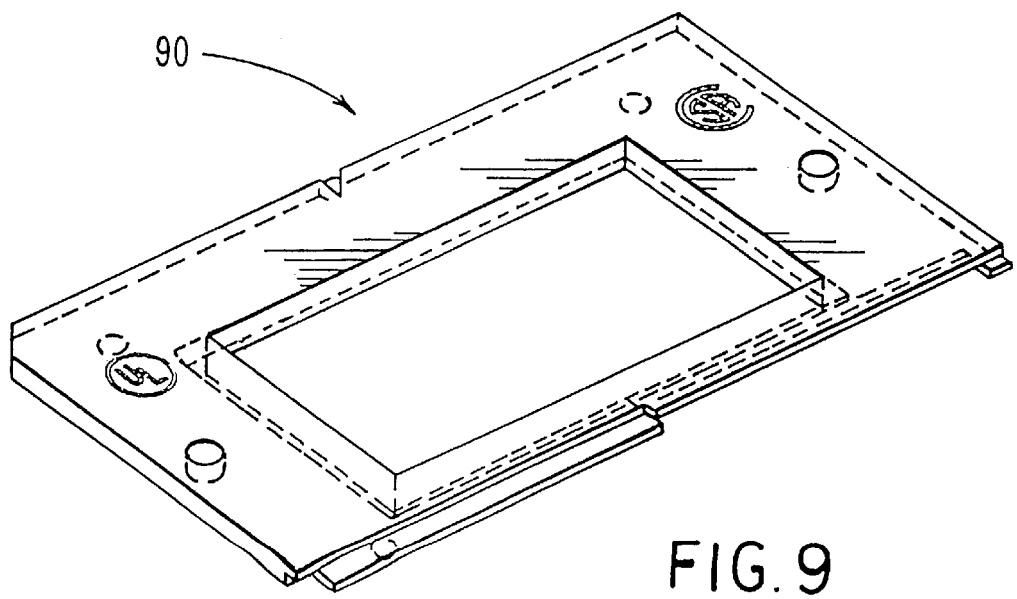
Figure 10:
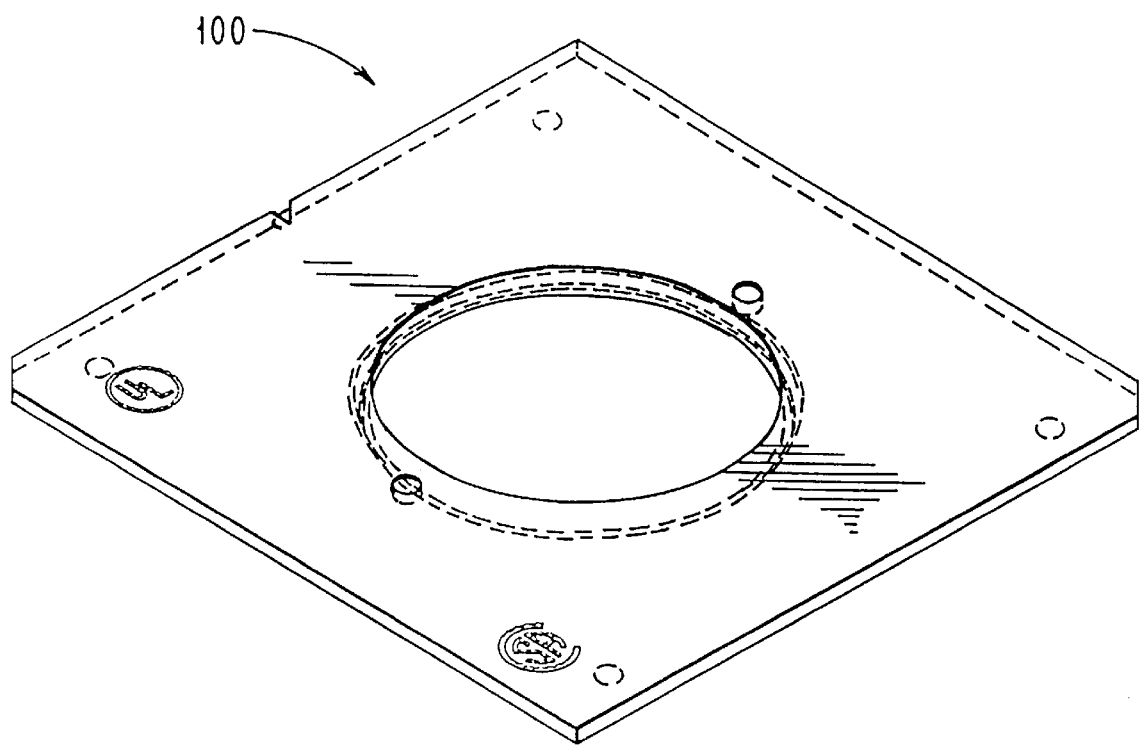

FIGS. 8, 9 and 10 illustrate typical alternative configurations for the cover plate, showing respectively a typical duplex plate 80, a GFCI (Ground Fault Circuit Interruptor) plate 90, and a 2.15 inch diameter two gang cover plate 100. The two gang cover plate 100 can be used in lieu of the assembled two gang cover plates 10 and 12 shown in FIG. 1, and also includes 45° chamfers 28 at opposite corners.

While several embodiments and variations of the present invention for an electrical device waterproof cover with snap-in modular plates are described in detail herein, it should be apparent that the disclosure and teachings of the present invention will suggest many alternative designs to those skilled in the art.

What is claimed is:

1. A cover plate for a one gang or two gang weatherproof cover for enclosing an electrical device in combination with the weatherproof cover, comprising:

a. said cover plate defining at least one aperture therein to receive at least one electrical device;

b. said cover plate having a side edge which defines an overhanging interlock extending along a first length of the side edge and an underhanging interlock extending along a second length of the side edge, wherein the overhanging interlock can interlock with an underhanging interlock of a second similar cover plate and the underhanging interlock can interlock with an overhanging interlock of the second similar cover plate to form a two gang cover plate for the two gang weatherproof cover, or the overhanging interlock can interlock with an underhanging interlock and the underhanging interlock can interlock with an overhanging interlock of the one gang weatherproof cover; and c. said cover enclosing an electrical device and having an inside edge which defines an overhanging interlock extending along a first length of the inside edge and an underhanging interlock extending along a second length of the inside edge, wherein the overhanging interlock of the cover interlocks with the underhanging interlock of the cover plate, and the underhanging interlock of the cover interlocks with the overhanging interlock of the cover plate, to interlock the cover plate and the cover.

2. The combination as claimed in claim 1, wherein the cover plate includes an angled chamfer at one corner, and the cover also includes an angled chamfer at one corner, to ensure a proper positioning of the cover plate with respect to the cover.

3. The combination as claimed in claim 1, wherein at least one other side edge of the cover plate snap fits under at least one retention boss in the cover.

4. The combination as claimed in claim 3, wherein three other side edges of the cover plate snap fit under retention bosses in the cover.

5. The combination as claimed in claim 3, wherein the at least one other side edge of the cover plate is secured between said at least one retention boss and a seating flange.

6. The combination as claimed in claim 3, wherein the cover is constructed of a nonmetallic, nonconductive, resilient material which is sufficiently resilient to allow the cover and the at least one retention boss to deform resiliently outwardly during the snap-fit installation of the cover plate therein.

7. A cover plate for use with a one gang or two gang weatherproof cover for an electrical device, comprising:

a. said cover plate defining at least one aperture therein to receive at least one electrical device;

b. said cover plate having a side edge which defines an overhanging interlock extending along a first length of the side edge and an underhanging interlock extending along a second length of the side edge, wherein the overhanging interlock can interlock with an underhanging interlock of a second similar cover plate and the underhanging interlock can interlock with an overhanging interlock of the second similar cover plate to form a two gang cover plate for use with a two gang weatherproof cover, or the overhanging interlock can interlock with an underhanging interlock and the underhangina interlock can interlock with an overhanging interlock of a one gang weatherproof cover; and c. wherein the first length of overhanging interlock and the second length of underhanging interlock are of unequal lengths to assure proper assembly with either the second similar cover plate to form a two gang cover plate, or with the one gang weatherproof cover.

8. A cover plate for use with a one gang or two gang weatherproof cover for an electrical device, comprising:

a. said cover plate defining at least one aperture therein to receive at least one electrical device;

b. said cover plate having a side edge which defines an overhanging interlock extending along a first length, of the side edge and an underhanging interlock extending along a second length of the side edge, wherein the overhanging interlock can interlock with an underhanging interlock of a second similar cover plate and the underhanging interlock can interlock with an overhanging interlock of the second similar cover plate to form a two gang cover plate for use with a two gang weatherproof cover, or the overhanging interlock can interlock with an underhanging interlock and the underhanging interlock can interlock with an overhanging interlock of a one gang weatherproof cover; and c. wherein the first length of overhanging interlock and the second length of underhanging interlock meet at a first common end located near the center of the length of the side edge of the cover plate, and a second end of the first length of overhanging interlock defines a small length of underhanging interlock, and a second end of the second length of underhanging interlock defines a small length of overhanging interlock, wherein the small lengths are provided to prevent rotation of assembled interlocked cover plates.

9. A cover plate as claimed in claim 8, in combination with a cover, wherein at least one other side edge of the cover plate snap fits under at least one retention boss in the cover.

10. The combination as claimed in claim 9, wherein three other side edges of the cover plate snap fit under retention bosses in the cover.

11. The combination as claimed in claim 9, wherein the at least one other side edge of the cover plate is secured between said at least one retention boss and a seating flange.

12. The combination as claimed in claim 11, wherein the cover is constructed of a nonmetallic nonconductive, resilient material which is sufficiently resilient to allow the cover and said at least one retention boss to deform resiliently outwardly during the snap-fit installation of the cover plate therein.

13. The combination as claimed in claim 12, wherein the cover plate includes an angled chamfer at one corner to ensure a proper positioning of the cover plate with respect to the cover which also includes an angled chamfer at one corner.

14. The combination as claimed in claim 13, wherein the first length of overhanging interlock and the second length of underhanging interlock are of unequal lengths to assure proper assembly with either the second similar cover plate to form the two gang cover plate, or with said one gang weatherproof cover.

* * * * *